(12) United States Patent
Gao et al.

(10) Patent No.: US 12,109,714 B1
(45) Date of Patent: Oct. 8, 2024

(54) KINEMATICS PARAMETER CALIBRATION METHOD AND SYSTEM OF MULTI-AXIS MOTION PLATFORM

(71) Applicant: GUANGDONG UNIVERSITY OF TECHNOLOGY, Guangzhou (CN)

(72) Inventors: Jian Gao, Guangzhou (CN); Guoqing Wu, Guangzhou (CN); Yuheng Luo, Guangzhou (CN); Lanyu Zhang, Guangzhou (CN); Zhuojun Zheng, Guangzhou (CN); Disai Chen, Guangzhou (CN); Xin Chen, Guangzhou (CN)

(73) Assignee: GUANGDONG UNIVERSITY OF TECHNOLOGY, Guangzhou (CN)

( * ) Notice: Subject to any disclaimer, the term of this patent is extended or adjusted under 35 U.S.C. 154(b) by 0 days.

(21) Appl. No.: 18/483,499

(22) Filed: Oct. 9, 2023

(30) Foreign Application Priority Data

Apr. 6, 2023 (CN) .......................... 202310355263.3

(51) Int. Cl.
  *B25J 9/16* (2006.01)
(52) U.S. Cl.
  CPC .......... *B25J 9/1692* (2013.01); *B25J 9/1697* (2013.01)
(58) Field of Classification Search
  CPC .......... B25J 9/1692; B25J 9/1697; G06T 7/80
  See application file for complete search history.

(56) References Cited

U.S. PATENT DOCUMENTS

| | | | | |
|---|---|---|---|---|
| 2019/0371003 A1* | 12/2019 | Lin | ............................ | G06T 7/70 |
| 2020/0198145 A1* | 6/2020 | Hsu | ........................ | B25J 9/1697 |
| 2022/0383547 A1* | 12/2022 | Ulrich | .................. | G06V 10/225 |
| 2022/0395981 A1* | 12/2022 | Xu | .......................... | B25J 9/1664 |
| 2022/0402131 A1* | 12/2022 | Sivanath | ................ | B25J 9/1687 |
| 2023/0123629 A1* | 4/2023 | Xu | .......................... | B25J 9/1602 |
| | | | | 700/251 |
| 2023/0339112 A1* | 10/2023 | Yin | ........................ | B25J 19/021 |

FOREIGN PATENT DOCUMENTS

| | | |
|---|---|---|
| CN | 109176531 A | 1/2019 |
| CN | 109658460 A | 4/2019 |
| CN | 110421562 A | 11/2019 |
| CN | 110842914 A | 2/2020 |
| CN | 111604598 A | 9/2020 |
| CN | 112767493 A | 5/2021 |
| CN | 114332239 A | 4/2022 |
| CN | 115861445 A | 3/2023 |
| WO | 2023005979 A1 | 2/2023 |

\* cited by examiner

*Primary Examiner* — Abby Y Lin
*Assistant Examiner* — Danielle M Jackson (57) ABSTRACT

Disclosed are a kinematics parameter calibration method and system of a multi-axis motion platform. The method comprises the following steps of: collecting calibration board images in different spatial positions according to a position relation between the platform and a camera, recording a corresponding motor motion amount, solving a hand-eye pose relation matrix and a pose matrix of a calibration board coordinate system in a platform tail end coordinate system, further solving a coordinate measured value of an angular point on the calibration board in a platform base coordinate system and a coordinate theoretical value of a position matrix of the tail end of the motion platform, determining a residual error matrix according to the measured value and the theoretical value, and identifying an error parameter by the residual error matrix to complete kinematics parameter calibration of the platform.

6 Claims, 5 Drawing Sheets

KINEMATICS PARAMETER CALIBRATION METHOD AND SYSTEM OF MULTI-AXIS MOTION PLATFORM

TECHNICAL FIELD

The present invention relates to the field of robot parameter calibration technologies, and particularly to a kinematics parameter calibration method and system of a multi-axis motion platform.

BACKGROUND OF THE PRESENT INVENTION

Kinematics calibration of a multi-axis motion platform refers to hand-eye calibration, and the hand-eye calibration needs to calibrate a position relation between a camera and a manipulator when converting camera three-dimensional coordinates into manipulator coordinates. Traditional kinematics calibration methods of the multi-axis motion platform or the manipulator are mostly realized by a high-accuracy pose measurement device such as a ball bar and a laser tracker. Although these devices may get good results when used in kinematics calibration, the devices have the problems of low efficiency and high cost, and are not easy to realize the automation of kinematics calibration.

In order to realize low-cost and automatic kinematics calibration, an industrial camera is used in cooperation with a calibration board as the pose measurement device at present, but in a process of identifying an error parameter of a kinematics model, the method has the problem that the accuracy of a final calibration result is affected due to easily generated tendency during error parameter identification caused by different position and pose dimensions. For example, in the technical solution of the patent with the application number CN202010398022.3, titled space manipulator kinematics parameter on-orbit calibration method suitable for full configurations, the industrial camera is well used to replace the laser tracker and other devices to realize the kinematics calibration of the multi-axis motion platform. However, in this technical solution, a measured value and a nominal value of a pose of a tail end of the manipulator are both a matrix in a form of $M_{4\times4}$, the matrix contains a pose information matrix of $R_{3\times3}$ and a position information matrix of $T_{1\times3}$, and a pose deviation matrix (residual error matrix) of the tail end of the manipulator is also obtained by subtracting the matrix corresponding to the measured value from the matrix corresponding to the nominal value after mathematical processing. Therefore, the residual error matrix contains both a position amount (in a unit of length) and a pose amount (in a unit of angle degree). When a least square method is used to identify parameters, a mathematical meaning of identification is to iteratively find an error parameter minimizing a sum of squares of various items of the residual error matrix, and a physical meaning of identification is to find an error parameter making a measured value of a pose of a tail end of the platform closest to a nominal value of the pose of the tail end of the platform. However, because the angle degree and the length are non-uniform in unit (different in dimension), a parameter identification result is finally affected due to easily generated tendency during parameter identification, which means that the accuracy of kinematic calibration is affected.

SUMMARY OF PRESENT INVENTION

An embodiment of the present invention provides a kinematics parameter calibration method and system of a multi-axis motion platform for solving the technical problem that the accuracy of a final calibration result is affected due to easily generated tendency during error parameter identification caused by different position and pose dimensions in an existing kinematics parameter calibration method of a multi-axis motion platform.

In view of this, a first aspect of the present invention provides a kinematics parameter calibration method of a multi-axis motion platform, which comprises the following steps of:

calibrating intrinsic parameters of a camera;

establishing a theoretical kinematics model of the motion platform, establishing a kinematics error model of the motion platform according to the theoretical kinematics model, and determining an error parameter;

solving a first homogeneous coordinate pose matrix of a calibration board coordinate system in a camera coordinate system based on a PnP algorithm according to calibration board photos in different spatial positions shot by a camera, and recording a first motor motion amount of a calibration board corresponding to the motion platform in each spatial position;

substituting the first motor motion amount into the theoretical kinematics model to obtain a pose matrix of the platform, and calculating a hand-eye pose relation matrix and a pose matrix of a calibration board coordinate system in a platform tail end coordinate system based on a hand-eye calibration method corresponding to a hand-eye position relation type of the motion platform according to one-to-one correspondence between the first homogeneous coordinate pose matrix and the pose matrix of the platform;

controlling the motion platform to move to be in different poses, acquiring calibration board images through the camera, solving a second homogeneous coordinate pose matrix of the calibration board coordinate system in the camera coordinate system based on the PnP algorithm according to the calibration board images, acquiring an angular point coordinate matrix consisting of at least three coplanar angular points on the calibration board, and determining a coordinate measured value of the angular point on the calibration board in a platform base coordinate system according to the hand-eye pose relation matrix, the angular point coordinate matrix and the second homogeneous coordinate pose matrix;

determining a coordinate theoretical value of a position matrix of the tail end of the motion platform according to second motor motion amounts of the motion platform in different poses, the theoretical kinematics model, and the pose matrix and the angular point coordinate matrix of the calibration board coordinate system in the platform tail end coordinate system; and determining the residual error matrix according to the multiple sets of coordinate measured values of the tail end of the motion platform and coordinate theoretical values of the tail end of the motion platform, and identifying the error parameter according to the residual error matrix to obtain the kinematics parameter calibration result of the platform.

Optionally, the step of determining the residual error matrix according to the multiple sets of coordinate measured values and coordinate theoretical values, and identifying the error parameter according to the residual error matrix to obtain the kinematics parameter calibration result of the platform, comprises the following step of:

determining the residual error matrix according to the multiple sets of coordinate measured values of the tail end of the motion platform and coordinate theoretical values of the tail end of the motion platform, and identifying the error parameter by an LM algorithm or a trust region algorithm according to the residual error matrix to obtain the kinematics parameter calibration result of the platform.

Optionally, the step of calibrating the intrinsic parameters of a camera, comprises the following step of:
collecting the calibration board photos in different spatial positions through the camera, and calibrating the intrinsic parameters of the camera—by Zhang Zhengyou Calibration Method.

Optionally, a calculation formula for the pose matrix of the calibration board coordinate system in the platform tail end coordinate system is:

$$^{end}_{board}M = ^{base}_{end}M^{-1} \cdot ^{base}_{camera}M \cdot ^{camera}_{board}M_1;$$

wherein, $^{end}_{board}M$ is the pose matrix of the calibration board coordinate system in the platform tail end coordinate system, $^{base}_{end}M$ is the pose matrix of the platform, $^{base}_{camera}M$ is the hand-eye pose relation matrix, and $^{camera}_{board}M_1$ is the first homogeneous coordinate pose matrix.

Optionally, a calculation formula for determining the coordinate measured value of the angular point on the calibration board in the platform base coordinate system is:

$$P_{HO} = ^{base}_{camera}M \cdot ^{camera}_{board}M_2 \cdot T;$$

wherein, $P_{HO}$ a coordinate measured value of a point on the calibration board in the platform base coordinate system, T is the angular point coordinate matrix of the calibration board, and $^{camera}_{board}M_2$ is the second homogeneous coordinate pose matrix.

Optionally, a calculation formula for determining the coordinate theoretical value of the position matrix of the tail end of the motion platform is:

$$P_{HT} = ^{base}_{end}M \cdot ^{end}_{board}M \cdot T;$$

wherein, $P_{HT}$ is the coordinate theoretical value of the position matrix of the tail end of the motion platform.

A second aspect of the present invention further provides a kinematics parameter calibration system of a multi-axis motion platform, which comprises:
a camera parameter-calibration module configured for calibrating intrinsic parameters of the camera;
an error model establishment module configured for establishing a theoretical kinematics model of the motion platform, establishing a kinematics error model of the motion platform according to the theoretical kinematics model, and determining an error parameter;
a first matrix solution module configured for solving a first homogeneous coordinate pose matrix of a calibration board coordinate system in a camera coordinate system based on a PnP algorithm according to calibration board photos in different spatial positions shot by a camera, and recording a first motor motion amount of a calibration board corresponding to the motion platform in each spatial position;
a second matrix solution module configured for substituting the first motor motion amount into the theoretical kinematics model to obtain a pose matrix of the platform, and calculating a hand-eye pose relation matrix and a pose matrix of a calibration board coordinate system in a platform tail end coordinate system based on a hand-eye calibration method corresponding to a hand-eye position relation type of the motion platform according to one-to-one correspondence between the first homogeneous coordinate pose matrix and the pose matrix of the platform;
a calibration board coordinate measured value solution module configured for controlling the motion platform to move to be in different poses, acquiring calibration board images through the camera, solving a second homogeneous coordinate pose matrix of the calibration board coordinate system in the camera coordinate system based on the PnP algorithm according to the calibration board images, acquiring an angular point coordinate matrix consisting of at least three coplanar angular points on the calibration board, and determining a coordinate measured value of the angular point on the calibration board in a platform base coordinate system according to the hand-eye pose relation matrix, the angular point coordinate matrix and the second homogeneous coordinate pose matrix;
a calibration board coordinate theoretical value solution module configured for determining a coordinate theoretical value of a position matrix of the tail end of the motion platform according to second motor motion amounts of the motion platform in different poses, the theoretical kinematics model, and the pose matrix and the angular point coordinate matrix of the calibration board coordinate system in the platform tail end coordinate system; and
an error parameter identification module configured for determining the residual error matrix according to the multiple sets of coordinate measured values of the tail end of the motion platform and coordinate theoretical values of the tail end of the motion platform, and identifying the error parameter according to the residual error matrix to obtain the kinematics parameter calibration result of the platform.

Optionally, the error parameter identification module is specifically configured for:
determining the residual error matrix according to the multiple sets of coordinate measured values of the tail end of the motion platform and coordinate theoretical values of the tail end of the motion platform, and identifying the error parameter by an LM algorithm or a trust region algorithm according to the residual error matrix to obtain the kinematics parameter calibration result of the platform.

Optionally, the camera parameter-calibration module is specifically configured for:
collecting the calibration board photos in different spatial positions through the camera, and calibrating the intrinsic parameters of the camera—by Zhang Zhengyou Calibration Method.

Optionally, a calculation formula for the pose matrix of the calibration board coordinate system in the platform tail end coordinate system is:

$$^{end}_{board}M = ^{base}_{end}M^{-1} \cdot ^{base}_{camera}M \cdot ^{camera}_{board}M_1;$$

wherein, $^{end}_{board}M$ is the pose matrix of the calibration board coordinate system in the platform tail end coordinate system, $^{base}_{end}M$ is the pose matrix of the platform, $^{base}_{camera}M$ is the hand-eye pose relation matrix, and $^{camera}_{board}M_1$ is the first homogeneous coordinate pose matrix.

a calculation formula for determining the coordinate measured value of the angular point on the calibration board in the platform base coordinate system is:

$$P_{HO} = ^{base}_{camera}M \cdot ^{camera}_{board}M_2 \cdot T;$$

wherein, $P_{HO}$ a coordinate measured value of a point on the calibration board in the platform base coordinate system, T is the angular point coordinate matrix of the calibration board, and $^{camera}_{board}M_2$ is the second homogeneous coordinate pose matrix;

a calculation formula for determining the coordinate theoretical value of the position matrix of the tail end of the motion platform is:

$$P_{HT} = ^{base}_{end}M \cdot ^{end}_{board}M \cdot T;$$

wherein, $P_{HT}$ is the coordinate theoretical value of the position matrix of the tail end of the motion platform.

It can be seen from the above technical solution that the kinematics parameter calibration method and system of the multi-axis motion platform provided by the present invention have the following advantages.

The kinematics parameter calibration method of the multi-axis motion platform provided by the present invention comprises calibrating the intrinsic parameters of the camera, then establishing the kinematics error model of the platform to determine the error parameter, collecting the calibration board images in different spatial positions according to the position relation between the platform and the camera, recording the corresponding motor motion amount, solving the hand-eye pose relation matrix and the pose matrix of the calibration board coordinate system in the platform tail end coordinate system, solving the coordinate measured value of the angular point on the calibration board in the platform base coordinate system according to the angular point coordinate matrix consisting of at least three coplanar angular points on the calibration board and the hand-eye pose relation matrix, solving the coordinate theoretical value of the position matrix of the tail end of the motion platform according to the angular point coordinate matrix consisting of at least three coplanar angular points on the calibration board and the pose matrix of the calibration board coordinate system in the platform tail end coordinate system, determining the residual error matrix according to the measured value and the theoretical value, and identifying the error parameter by the residual error matrix to complete kinematics parameter calibration of the platform. According to the present invention, the method of measuring position amounts of at least three points on the calibration board replaces a traditional method of measuring position and pose amounts of one point on the calibration board, which avoids the problem of inaccurate parameter identification caused by dimension inconsistency between the position amount and the pose amount during parameter identification, and gives full play to the advantages of measurement by the camera compared with measurement by the laser tracker and other devices, which means that spatial multi-point positions may be measured at the same time, thus bringing substantial improvement to the accuracy of the kinematics calibration result of the platform. The present invention solves the technical problem that the accuracy of a final calibration result is affected due to easily generated tendency during error parameter identification caused by different position and pose dimensions in an existing kinematics parameter calibration method of a multi-axis motion platform.

The kinematics parameter calibration system of the multi-axis motion platform provided by the present invention is used for executing the kinematics parameter calibration method of the multi-axis motion platform provided by the present invention, with a principle and an obtained technical effect the same as those of the kinematics parameter calibration method of the multi-axis motion platform provided by the present invention, which will not be repeated herein.

DESCRIPTION OF THE DRAWINGS

In order to make those skilled in the art better understand the solutions of the present invention, the technical solutions in the embodiments of the present invention are clearly and completely described with reference to the drawings in the embodiments of the present invention. Obviously, the described embodiments are merely some but not all of the embodiments of the present invention. Based on the embodiments in the present invention, all other embodiments obtained by those of ordinary skills in the art without going through any creative work should fall within the scope of protection of the present invention.

DETAILED DESCRIPTION OF PREFERRED EMBODIMENTS

In order to make those skilled in the art better understand the solutions of the present invention, the technical solutions in the embodiments of the present invention are clearly and completely described with reference to the drawings in the embodiments of the present invention. Obviously, the described embodiments are merely some but not all of the embodiments of the present invention. Based on the embodiments in the present invention, all other embodiments obtained by those of ordinary skills in the art without going through any creative work should fall within the scope of protection of the present invention.

Figure 1:
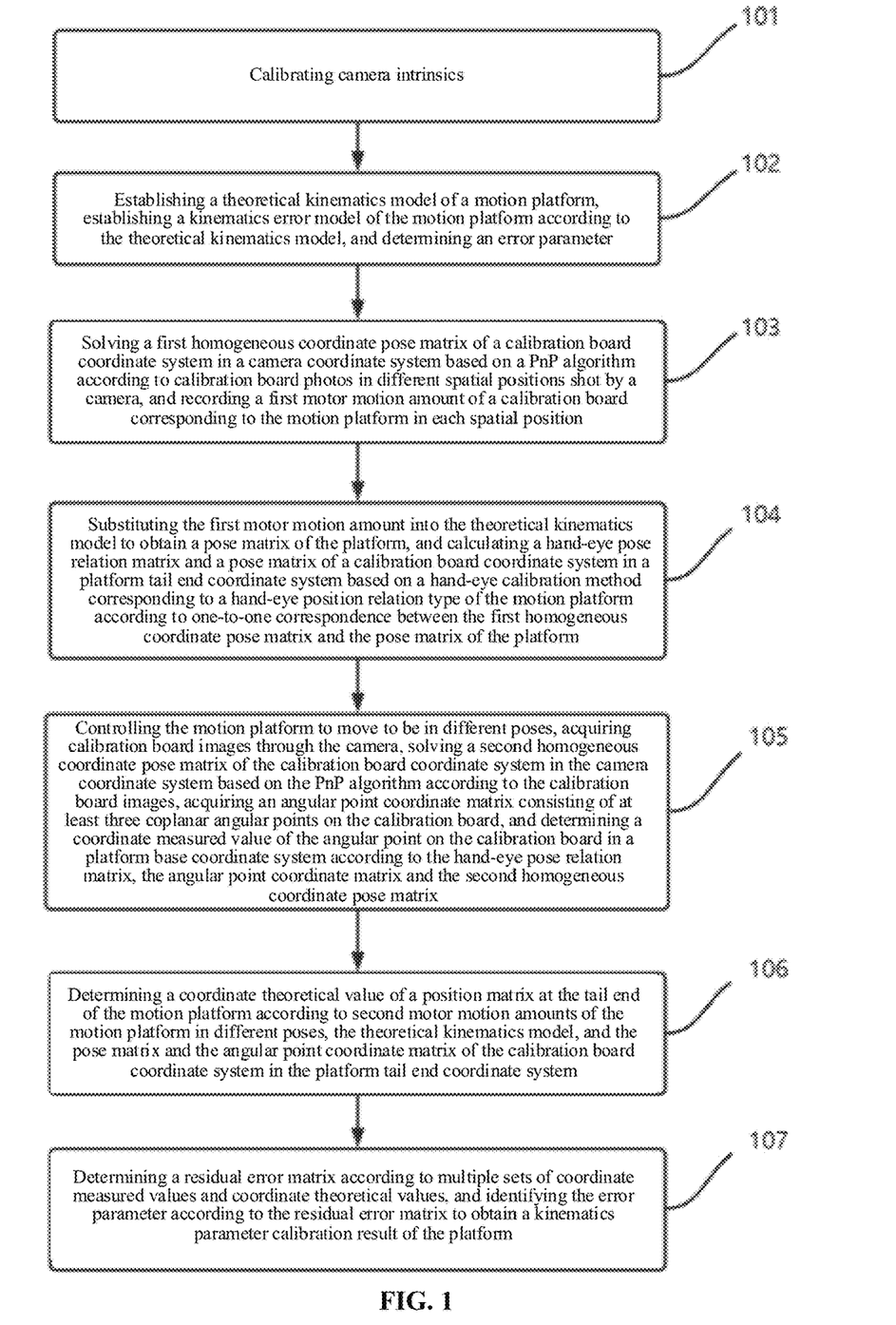
FIG. 1 is a flow chart of a kinematics parameter calibration method of a multi-axis motion platform in an embodiment of the present invention.
Figure 4:
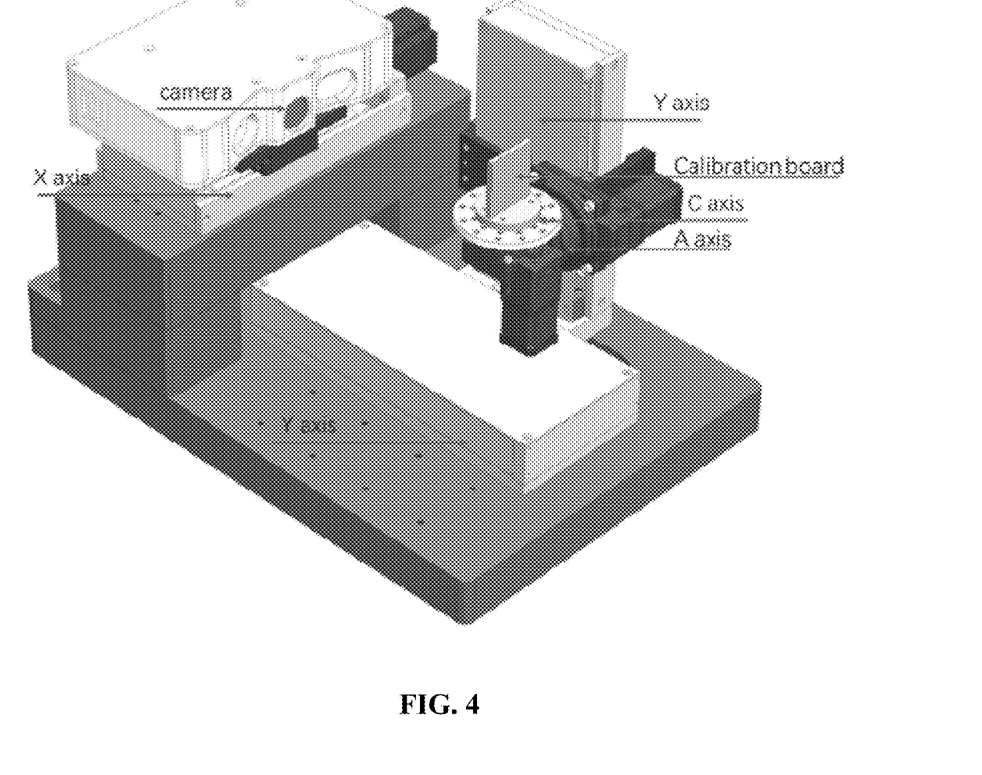
FIG. 4 is a three-dimensional schematic diagram of a multi-axis motion platform.
Figure 5:
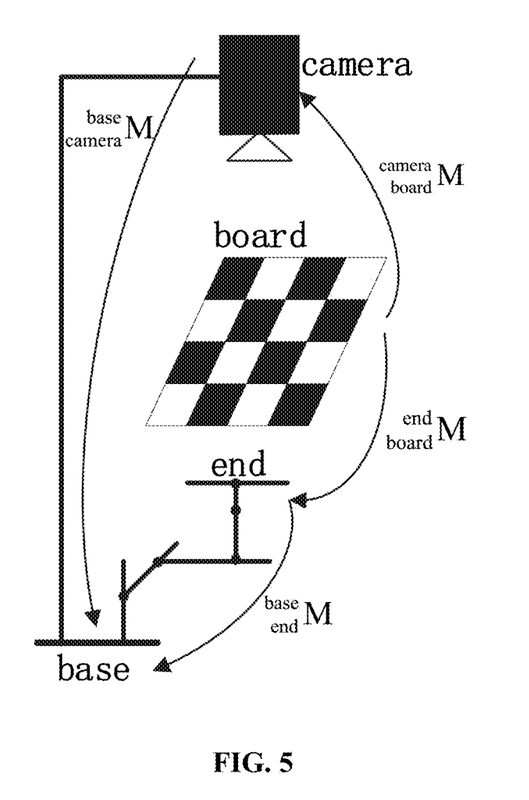
FIG. 5 is a schematic diagram showing the relationship among all coordinate systems.

For easy understanding, with reference to FIG. 1, the present invention provides an embodiment of a kinematics parameter calibration method of a multi-axis motion platform, which comprises the following steps. FIG. 4 shows a multi-axis motion platform including a camera and a calibration board. FIG. 5 shows the relationship among all coordinate systems.

In step 101, intrinsic parameters of the camera—are calibrated.

It should be noted that in the embodiment of the present invention, the intrinsic parameters of the camera—of the multi-axis motion platform need to be calibrated first. Specifically, calibration board photos in different spatial positions may be collected through the camera, and the intrinsic parameters of the camera are calibrated by Zhang Zhengyou Calibration Method. The calibration of the intrinsic parameters of the camera by Zhang Zhengyou Calibration Method belongs to the prior art, which will not be repeated herein.

In step 102, a theoretical kinematics model of the motion platform is established, a kinematics error model of the motion platform is established according to the theoretical kinematics model, and an error parameter is determined.

It should be noted that the theoretical kinematics model of the motion platform is established by a geometric method or a manipulator DH method, then the kinematics error model of the motion platform is established according to the theoretical kinematics model by an error mapping or error transmission method, and the error parameter is determined.

In step 103, a first homogeneous coordinate pose matrix of a calibration board coordinate system in a camera coordinate system is solved based on a PnP algorithm according to calibration board photos in different spatial positions shot by a camera, and a first motor motion amount of a calibration board corresponding to the motion platform in each spatial position is recorded.

It should be noted that the calibration board is controlled to be located in a plurality of different spatial positions, and the calibration board in each spatial position is shot by the camera to obtain the calibration board photos. Because two-dimensional pixel coordinates of the angular point on the calibration board correspond to three-dimensional world coordinates of the angular point on the calibration board one by one, the first homogeneous coordinate pose matrix $_{board}^{camera}M_1$ of the calibration board coordinate system in the camera coordinate system may be solved by the PnP (Perspective-n-Point) algorithm. Meanwhile, the first motor motion amount (the motor motion amount refers to a translation motion amount of a translation axis of the multi-axis motion platform relative to an origin and a rotation motion amount of a rotation axis of the multi-axis motion platform relative to the origin) of the motion platform corresponding to the calibration board in each spatial position is recorded.

In step 104, the first motor motion amount is substituted into the theoretical kinematics model to obtain a pose matrix of the platform, and a hand-eye pose relation matrix and a pose matrix of a calibration board coordinate system in a platform tail end coordinate system are calculated based on a hand-eye calibration method corresponding to a hand-eye position relation type of the motion platform according to one-to-one correspondence between the first homogeneous coordinate pose matrix and the pose matrix of the platform.

It should be noted that the first motor motion amount is substituted into the theoretical kinematics model established in the step 102 to obtain the pose matrix $_{end}^{base}M$ of the platform. According to the one-to-one correspondence between the first homogeneous coordinate pose matrix $_{board}^{camera}M_1$ and the pose matrix $_{end}^{base}M$ of the platform, and according to the hand-eye calibration method corresponding to the existing hand-eye position relation type (comprising two types of an eye arranged outside a hand and an eye arranged on a hand), the hand-eye pose relation matrix $_{camera}^{base}M$ is calculated. Finally, according to the hand-eye pose relation matrix $_{camera}^{base}M$, the pose matrix $_{board}^{end}M$ of the calibration board coordinate system in the platform tail end coordinate system is calculated. Specifically, a calculation formula for the pose matrix of the calibration board coordinate system in the platform tail end coordinate system is:

$$_{board}^{end}M = {_{end}^{base}M}^{-1} \cdot {_{camera}^{base}M} \cdot {_{board}^{camera}M_1};$$

wherein, $_{board}^{end}M$ is the pose matrix of the calibration board coordinate system in the platform tail end coordinate system, $_{end}^{base}M$ is the pose matrix of the platform, $_{camera}^{base}M$ is the hand-eye pose relation matrix, and $_{board}^{camera}M_1$ is the first homogeneous coordinate pose matrix.

In step 105, the motion platform is controlled to move to be in different poses, calibration board images are acquired through the camera, a second homogeneous coordinate pose matrix of the calibration board coordinate system in the camera coordinate system is solved based on the PnP algorithm according to the calibration board images, an angular point coordinate matrix consisting of at least three coplanar angular points on the calibration board is acquired, and a coordinate measured value of the angular point on the calibration board in a platform base coordinate system is determined according to the hand-eye pose relation matrix, the angular point coordinate matrix and the second homogeneous coordinate pose matrix.

Figure 2:
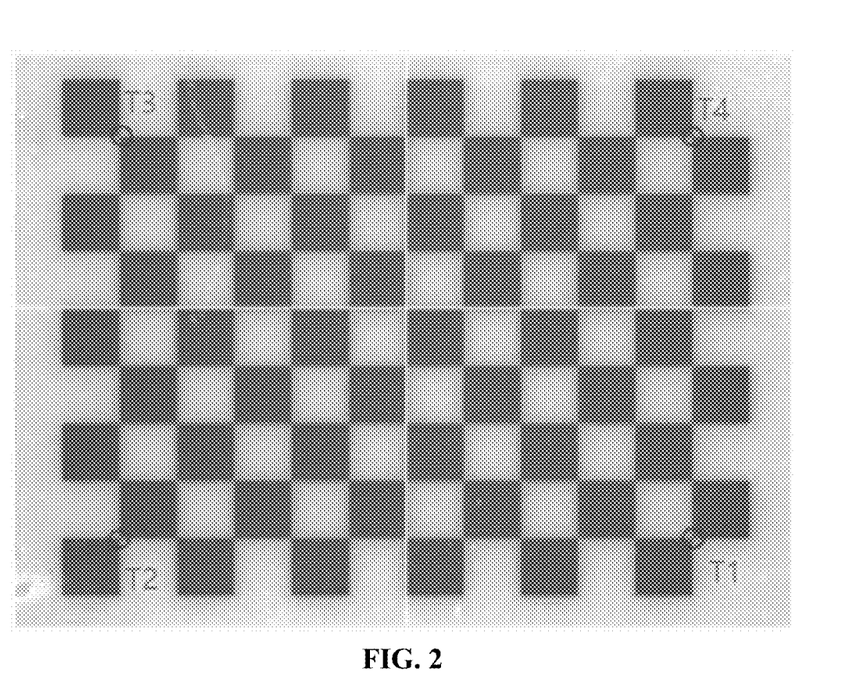
FIG. 2 is a schematic diagram of four angular points selected on a calibration board in the embodiment of the present invention.

It should be noted that, after determining the hand-eye pose relation matrix $_{camera}^{base}M$ and the pose matrix $_{board}^{end}M$ of the calibration board coordinate system in the platform tail end coordinate system, the motion platform is controlled to move to be in different poses, the calibration board images in different poses are acquired through the camera, and the second homogeneous coordinate pose matrix $_{board}^{camera}M_2$ of the calibration board coordinate system in the camera coordinate system is solved by the PnP algorithm. Because a position of each angular point on the calibration board is known relative to the origin of the calibration board coordinate system, the angular point coordinate matrix T consisting of at least three coplanar angular points on the calibration board may be obtained. Angular point coordinate matrices corresponding to four angular points $T_1$, $T_2$, $T_3$ and $T_4$ shown in FIG. 2 are all a column matrix of 1×4. Subsequently, according to the hand-eye pose relation matrix $_{camera}^{base}M$, the angular point coordinate matrix T and the second homogeneous coordinate pose matrix $_{board}^{camera}M_2$, the coordinate measured value of the angular point on the calibration board in the platform base coordinate system is determined. A specific formula is:

$$P_{HO} = {_{camera}^{base}M} \cdot {_{board}^{camera}M_2} \cdot T;$$

wherein, $P_{HO}$ a coordinate measured value of a point on the calibration board in the platform base coordinate system, T is the angular point coordinate matrix of the calibration board, and $_{board}^{camera}M_2$ is the second homogeneous coordinate pose matrix.

According to the above formula, by substituting $T_1$, $T_2$, $T_3$ and $T_4$ respectively, coordinate measured values $P_{HO1}$, $P_{HO2}$, $P_{HO3}$ and $P_{HO4}$ corresponding to the four angular points in the platform base coordinate system may be obtained. $P_{HO1}$, $P_{HO2}$, $P_{HO3}$ and $P_{HO4}$ are homogeneous coordinate forms, and corresponding three-dimensional coordinate forms may be transformed by the following formula:

$$P_{HO} = {}_{camera}^{base}M \cdot {}_{board}^{camera}M_2 \cdot T;$$

so that, the three-dimensional coordinate forms $P_{O1}$, $P_{O2}$, $P_{O3}$ and $P_{O4}$ corresponding to $P_{HO1}$, $P_{HO2}$, $P_{HO3}$ and $P_{HO4}$ may be obtained.

In step 106, a coordinate theoretical value of a position matrix of the tail end of the motion platform is determined according to second motor motion amounts of the motion platform in different poses, the theoretical kinematics model, and the pose matrix and the angular point coordinate matrix of the calibration board coordinate system in the platform tail end coordinate system).

It should be noted that the corresponding second motor motion amounts when the motion platform moves to be in different poses in the step 105 are recorded, and the pose matrix ${}_{end}^{base}M$ of the platform may be obtained according to the second motor motion amounts and the theoretical kinematics model established in the step 102. Subsequently, the coordinate theoretical value of the position matrix of the tail end of the motion platform may be obtained in combination with the pose matrix ${}_{board}^{end}M$ and the angular point coordinate matrix T of the calibration board coordinate system in the platform tail end coordinate system. A calculation formula is:

$$P_{HT} = {}_{end}^{base}M \cdot {}_{board}^{end}M \cdot T;$$

wherein, $P_{HT}$ is the coordinate theoretical value of the position matrix of the tail end of the motion platform.

According to the above formula, by substituting $T_1$, $T_2$, $T_3$ and $T_4$ respectively, coordinate theoretical values $P_{HT1}$, $P_{HT2}$, $P_{HT3}$ and $P_{HT4}$ corresponding to the four angular points in the position matrix of the tail end of the motion platform may be obtained. $P_{HT1}$, $P_{HT2}$, $P_{HT3}$ and $P_{HT4}$ are homogeneous coordinate forms, and corresponding three-dimensional coordinate forms may be transformed by the following formula:

$$P_{HT}=[X_T,Y_T,Z_T,1]^{-1}=[P_T^{-1} \cdot 1]^{-1};$$

so that, the three-dimensional coordinate forms $P_{T1}$, $P_{T2}$, $P_{T3}$ and $P_{T4}$ corresponding to $P_{HT1}$, $P_{HT2}$, $P_{HT3}$ and $P_{HT4}$ may be obtained.

In step 107, the residual error matrix is determined according to the multiple sets of coordinate measured values of the tail end of the motion platform and coordinate theoretical values of the tail end of the motion platform, and the error parameter is identified according to the residual error matrix to obtain the kinematics parameter calibration result of the platform.

It should be noted that there will be a difference value between each pair of measured value and theoretical value, and at the moment, the residual error matrix may be obtained in each pose of the motion platform, such as $E_1=[P_{T1}-P_{O1}, P_{T2}-P_{O2}, P_{T3}-P_{O3}, P_{T4}-P_{O4}]^{-1}$. By changing the pose of the motion platform, new measured values and theoretical values may be obtained, thus obtaining new residual error matrices $E_2$, $E_3$, $E_4$, . . . . Therefore, a final residual error matrix $E=[E_1, E_2, E_3, E_4, \ldots]^{-1}$ is obtained. The error parameter is identified by an LM algorithm or a trust region algorithm according to the residual error matrix to obtain the kinematics parameter calibration result of the platform. The LM algorithm and the trust region algorithm have different ideas and implementation methods in optimizing a nonlinear minimization problem, but goals of the two algorithms are both to find a minimum value of an objective function through iteration. The two algorithms may both be used in error parameter identification. Taking the LM (Levenberg-Marquardt) algorithm as an example, this algorithm has the advantages of both gradient descent method and Gaussian Newton method, and is an optimization algorithm to find to make a sum of squares of various items of the residual error matrix reach a minimum value (which is less than a given threshold) by iteratively modifying the parameter continuously. Generally speaking, when the sum of squares of various items of the residual error matrix reaches the minimum value, the corresponding parameter is an optimal parameter to be solved, which is namely an optimal error parameter in kinematics error parameter calibration.

It can be seen that the kinematics parameter calibration method of the multi-axis motion platform provided by the present invention only considers the measured value and the theoretical value of the position amount, without considering the pose amount, so that the composition of the residual error matrix is also all information related to the position amount, thus avoiding the problem that there are both the position amount and the pose amount in the residual error matrix, leading to inaccurate solution of the error parameter due to different dimensions of the position amount and the pose amount. Compared with a traditional method of only measuring a position amount and a pose amount of one point, in the kinematics parameter calibration method of the multi-axis motion platform provided by the present invention, the position amounts of at least three points are measured, so that there is no problem of inaccurate calibration caused by too little measurement information.

The kinematics parameter calibration method of the multi-axis motion platform provided by the present invention comprises calibrating intrinsic parameters of the camera, then establishing the kinematics error model of the platform to determine the error parameter, collecting the calibration board images in different spatial positions according to the position relation between the platform and the camera, recording the corresponding motor motion amount, solving the hand-eye pose relation matrix and the pose matrix of the calibration board coordinate system in the platform tail end coordinate system, solving the coordinate measured value of the angular point on the calibration board in the platform base coordinate system according to the angular point coordinate matrix consisting of at least three coplanar angular points on the calibration board and the hand-eye pose relation matrix, solving the coordinate theoretical value of the position matrix of the tail end of the motion platform according to the angular point coordinate matrix consisting of at least three coplanar angular points on the calibration board and the pose matrix of the calibration board coordinate system in the platform tail end coordinate system, determining the residual error matrix according to the measured value and the theoretical value, and identifying the error parameter by the residual error matrix to complete kinematics parameter calibration of the platform. According to the present invention, the method of measuring position amounts of at least three points on the calibration board replaces a traditional method of measuring position and pose amounts of one point on the calibration board, which avoids the problem of inaccurate parameter identification caused by dimension inconsistency between the position amount and the pose amount during parameter identification, and gives full play to the advantages of measurement by the camera compared with measurement by the laser tracker and other devices, which means that spatial multi-point positions may be measured at the same time, thus bringing substantial improvement to the accuracy of the kinematics calibration result of the platform. The present invention solves the technical problem that the accuracy of a final calibration result is affected due to easily generated tendency during error parameter identification caused by different position and pose dimensions in an existing kinematics parameter calibration method of a multi-axis motion platform.

Figure 3:
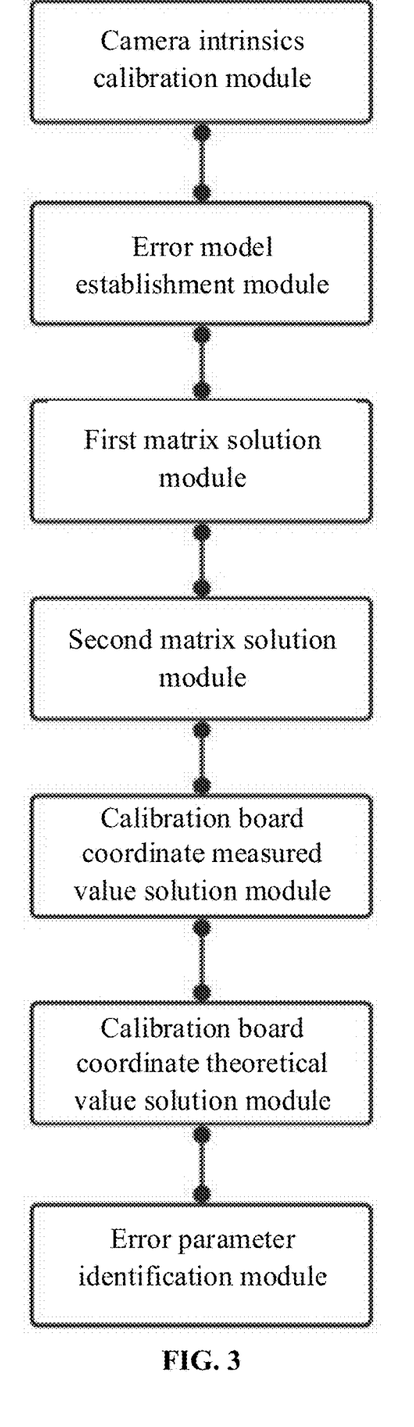
FIG. 3 is a schematic structural diagram of a kinematics parameter calibration system of a multi-axis motion platform in the embodiment of the present invention.

For easy understanding, with reference to FIG. 3, the present invention provides an embodiment of a kinematics parameter calibration system of a multi-axis motion platform, which comprises:

a camera parameters-calibration module configured for calibrating intrinsic parameters of the camera;

an error model establishment module configured for establishing a theoretical kinematics model of the motion platform, establishing a kinematics error model of the motion platform according to the theoretical kinematics model, and determining an error parameter;

a first matrix solution module configured for solving a first homogeneous coordinate pose matrix of a calibration board coordinate system in a camera coordinate system based on a PnP algorithm according to calibration board photos in different spatial positions shot by a camera, and recording a first motor motion amount of a calibration board corresponding to the motion platform in each spatial position;

a second matrix solution module configured for substituting the first motor motion amount into the theoretical kinematics model to obtain a pose matrix of the platform, and calculating a hand-eye pose relation matrix and a pose matrix of a calibration board coordinate system in a platform tail end coordinate system based on a hand-eye calibration method corresponding to a hand-eye position relation type of the motion platform according to one-to-one correspondence between the first homogeneous coordinate pose matrix and the pose matrix of the platform;

a calibration board coordinate measured value solution module configured for controlling the motion platform to move to be in different poses, acquiring calibration board images through the camera, solving a second homogeneous coordinate pose matrix of the calibration board coordinate system in the camera coordinate system based on the PnP algorithm according to the calibration board images, acquiring an angular point coordinate matrix consisting of at least three coplanar angular points on the calibration board, and determining a coordinate measured value of the angular point on the calibration board in a platform base coordinate system according to the hand-eye pose relation matrix, the angular point coordinate matrix and the second homogeneous coordinate pose matrix;

a calibration board coordinate theoretical value solution module configured for determining a coordinate theoretical value of a position matrix of the tail end of the motion platform according to second motor motion amounts of the motion platform in different poses, the theoretical kinematics model, and the pose matrix and the angular point coordinate matrix of the calibration board coordinate system in the platform tail end coordinate system;

an error parameter identification module configured for determining the residual error matrix according to the multiple sets of coordinate measured values of the tail end of the motion platform and coordinate theoretical values of the tail end of the motion platform, and identifying the error parameter according to the residual error matrix to obtain the kinematics parameter calibration result of the platform.

The error parameter identification module is specifically configured for:

determining the residual error matrix according to the multiple sets of coordinate measured values of the tail end of the motion platform and coordinate theoretical values of the tail end of the motion platform, and identifying the error parameter by an LM algorithm or a trust region algorithm according to the residual error matrix to obtain the kinematics parameter calibration result of the platform.

The camera parameter-calibration module is specifically configured for:

collecting the calibration board photos in different spatial positions through the camera, and calibrating the intrinsic parameters camera—by Zhang Zhengyou Calibration Method.

A calculation formula for the pose matrix of the calibration board coordinate system in the platform tail end coordinate system is:

$$^{end}_{board}M = {}^{base}_{end}M^{-1} \cdot {}^{base}_{camera}M \cdot {}^{camera}_{board}M_1;$$

wherein, $^{end}_{board}M$ is the pose matrix of the calibration board coordinate system in the platform tail end coordinate system, $^{base}_{end}M$ is the pose matrix of the platform, $^{base}_{camera}M$ is the hand-eye pose relation matrix, and $^{camera}_{board}M_1$ is the first homogeneous coordinate pose matrix.

a calculation formula for determining the coordinate measured value of the angular point on the calibration board in the platform base coordinate system is:

$$P_{HO} = {}^{base}_{camera}M \cdot {}^{camera}_{board}M_2 \cdot T;$$

wherein, $P_{HO}$ a coordinate measured value of a point on the calibration board in the platform base coordinate system, T is the angular point coordinate matrix of the calibration board, and $^{camera}_{board}M_2$ is the second homogeneous coordinate pose matrix;

a calculation formula for determining the coordinate theoretical value of the position matrix of the tail end of the motion platform is:

$$P_{HT} = {}^{base}_{end}M \cdot {}^{end}_{board}M \cdot T;$$

wherein, $P_{HT}$ is the coordinate theoretical value of the position matrix of the tail end of the motion platform.

The kinematics parameter calibration system of the multi-axis motion platform provided by the present invention is used for executing the kinematics parameter calibration method of the multi-axis motion platform provided by the present invention, with a principle and an obtained technical effect the same as those of the kinematics parameter calibration method of the multi-axis motion platform provided by the present invention, which will not be repeated herein.

The terms "first", "second", "third", "fourth", and the like (if any) in the specification of the present invention are used to distinguish similar objects, and are not necessarily used to describe a specific order or sequence. It should be understood that data used in this way may be interchanged under appropriate circumstances, so that the embodiments of the present invention described herein can be implemented in a sequence other than those illustrated or described herein. In addition, the terms "comprising", "having" and any variations thereof are intended to cover non-exclusive inclusion. For example, a process, method, system, product or device comprising a series of steps or units is not necessarily limited to those steps or units clearly listed, but may comprise other steps or units not clearly listed in or inherent to the process, method, product or device.

As mentioned above, the above embodiments are only used to illustrate the technical solution of the invention, rather than limiting the present invention; although the present invention has been described in detail with reference to the foregoing embodiments, those of ordinary skills in the art should understand that: he can still modify the technical solutions set forth by the above embodiments, or make equivalent substitutions to part of the technical features of them. However, these modifications or substitutions shall not depart from the spirit and scope of the technical solutions of the embodiments of the present invention.

We claim:

1. A kinematics parameter calibration method of a multi-axis motion platform, comprising the following steps of:
   calibrating intrinsic parameters of a camera;
   establishing a theoretical kinematics model of the multi-axis motion platform, establishing a kinematics error model of the multi-axis motion platform according to the theoretical kinematics model, and determining an error parameter;
   based on photos of a calibration board taken by the camera at different spatial positions, solving for a first homogeneous coordinate pose matrix of a calibration board coordinate system in a camera coordinate system using a PnP (Perspective-n-Point) algorithm and recording a first motor motion amount corresponding to the multi-axis motion platform at each spatial position;
   substituting the first motor motion amount into the theoretical kinematics model to obtain a platform pose matrix; based on a one-to-one relationship between the first homogeneous coordinate pose matrix and the platform pose matrix, and using a hand-eye calibration method corresponding to a type of hand-eye position relationship, calculating a hand-eye pose relation matrix and a pose matrix of the calibration board coordinate system in an end coordinate system of the multi-axis motion platform; wherein the types of the hand-eye position relation include an eye outside hand and an eye on hand;
   controlling the multi-axis motion platform to move to different poses, capturing images of the calibration board through the camera; based on the images of the calibration board, solving for a second homogeneous coordinate pose matrix of the calibration board coordinate system in the camera coordinate system using the PnP algorithm; obtaining a corner point coordinate matrix formed by at least three coplanar calibration board corner points in the calibration board coordinate system; and based on the hand-eye pose relationship matrix, the corner point coordinate matrix, and the second homogeneous coordinate pose matrix, determining coordinate measurement values of the calibration board corner points in a platform base coordinate system;
   based on second motor motion amounts in different poses, the theoretical kinematic model, the pose matrix and the corner point coordinate matrix of the calibration board in the end coordinate system of the multi-axis motion platform, determining coordinates theoretical values of an end position matrix of the multi-axis motion platform; and based on multiple sets of coordinate measurement values and coordinates theoretical values, determining a residual error matrix, and identifying error parameters to obtain a calibration result of the kinematic parameters of the multi-axis motion platform.

2. The kinematics parameter calibration method of the multi-axis motion platform according to claim 1, wherein the step of determining a residual error matrix and identifying error parameters to obtain a calibration result of the kinematic parameters of the multi-axis motion platform comprises the following step of:
   determining the residual error matrix according to the multiple sets of the coordinate measurement values of the end of the multi-axis motion platform and coordinate theoretical values of the end of the multi-axis motion platform, and identifying the error parameters by an LM (Levenberg-Marquardt) algorithm or a Trust Region algorithm according to the residual error matrix to obtain the kinematics parameter calibration result of the multi-axis motion platform.

3. The kinematics parameter calibration method of the multi-axis motion platform according to claim 1, wherein the step of calibrating intrinsic parameters of the camera comprises the following step of:
   collecting the photos of the calibration board taken by the camera at different spatial positions, and calibrating the intrinsic parameters of the camera by Zhang Zhengyou's Calibration Method.

4. The kinematics parameter calibration method of the multi-axis motion platform according to claim 1, wherein a calculation formula for the pose matrix of the calibration board coordinate system in the end coordinate system of the multi-axis motion platform is:

$$^{end}_{board}M = {^{base}_{end}M^{-1}} \otimes {^{base}_{camera}M} \otimes {^{camera}_{board}M_1}$$

wherein, $^{end}_{board}M$ is the pose matrix of the calibration board coordinate system in the end coordinate system of the multi-axis motion platform, $^{base}_{end}M$ is the platform pose matrix, $^{base}_{camera}M$ is the hand-eye pose relationship matrix, and $^{camera}_{board}M_1$ is the first homogeneous coordinate pose matrix.

5. The kinematics parameter calibration method of the multi-axis motion platform according to claim 4, wherein a calculation formula for determining the coordinate measurement values of the calibration board corner points on the calibration board in the multi-axis motion platform base coordinate system is:

$$P_{HO} = {^{base}_{camera}M} \otimes {^{camera}_{board}M_2} \otimes T$$

wherein, $P_{HO}$ are coordinate measurement values of the calibration board corner points in the platform base coordinate system, T is the corner point coordinate matrix in the calibration board coordinate system, and $^{camera}_{board}M_2$ is the second homogeneous coordinate pose matrix.

6. The kinematics parameter calibration method of the multi-axis motion platform according to claim 5, wherein a calculation formula for determining the coordinate theoretical values of the position matrix of the end of the multi-axis motion platform is:

$$P_{HT} = {}^{base}_{end}M_{10} \cdot {}^{end}_{board}M_{10} \cdot T$$

wherein, $P_{HT}$ are the coordinate theoretical values of the position matrix of the end of the multi-axis motion platform.

* * * * *